(12) United States Patent
Farrell

(10) Patent No.: US 8,115,688 B2
(45) Date of Patent: Feb. 14, 2012

(54) RF CONDUIT AND SYSTEMS IMPLEMENTING SAME

(75) Inventor: Edward M. Farrell, Saratoga, CA (US)

(73) Assignee: Intelleflex Corporation, Santa Clara, CA (US)

( * ) Notice: Subject to any disclaimer, the term of this patent is extended or adjusted under 35 U.S.C. 154(b) by 348 days.

(21) Appl. No.: 12/258,304

(22) Filed: Oct. 24, 2008

(65) Prior Publication Data

US 2010/0103071 A1   Apr. 29, 2010

(51) Int. Cl.
*H01Q 1/24* (2006.01)
*H01Q 21/00* (2006.01)

(52) U.S. Cl. ........................ 343/702; 343/853
(58) Field of Classification Search ........... 343/700 MS, 343/702, 850, 853, 873
See application file for complete search history.

(56) References Cited

U.S. PATENT DOCUMENTS

| | | | | |
|---|---|---|---|---|
| RE29,578 E | * | 3/1978 | Javan | 250/211 |
| 4,512,024 A | * | 4/1985 | Gutleber | 375/254 |
| 5,276,746 A | * | 1/1994 | Adar et al. | 385/27 |
| 6,563,425 B2 | | 5/2003 | Nicholson et al. | 340/572.7 |
| 6,864,844 B2 | * | 3/2005 | Sato | 343/702 |
| 6,943,688 B2 | | 9/2005 | Chung et al. | 340/572.7 |
| 6,985,122 B2 | | 1/2006 | Cohen | 343/793 |
| 7,042,225 B2 | * | 5/2006 | Barber | 324/338 |
| 7,323,977 B2 | | 1/2008 | Kodukula et al. | 340/505 |
| 7,429,953 B2 | * | 9/2008 | Buris et al. | 343/700 MS |
| 7,671,718 B2 | * | 3/2010 | Turner et al. | 340/5.61 |
| 2003/0080905 A1 | * | 5/2003 | Lin et al. | 343/702 |
| 2004/0110469 A1 | * | 6/2004 | Judd et al. | 455/15 |
| 2005/0162270 A1 | | 7/2005 | Lambright et al. | 340/539.1 |
| 2006/0164231 A1 | | 7/2006 | Salisbury et al. | 340/505 |
| 2007/0182544 A1 | | 8/2007 | Benson et al. | 340/521 |
| 2007/0200701 A1 | | 8/2007 | English et al. | 340/572.1 |
| 2007/0273503 A1 | | 11/2007 | Twitchell, Jr. | 340/539.1 |
| 2008/0001746 A1 | | 1/2008 | Childress et al. | 340/572.1 |
| 2008/0061984 A1 | | 3/2008 | Breed et al. | 340/572.7 |

OTHER PUBLICATIONS http://www.technovelgy.com/ct/Technology-Article.asp?ArtNum=50 (definition of RFID tag).*

* cited by examiner

*Primary Examiner* — Hoanganh Le
(74) *Attorney, Agent, or Firm* — Zilka-Kotab, PC

(57) ABSTRACT

An RF conduit according to one embodiment includes a pair of antennas coupled together by a transmission line such that RF tunneling occurs along the transmission line between the antennas and an RF signal received at one antenna is reradiated at the other antenna. An RF conduit according to another embodiment includes a pair of antenna traces each having first and second end portions and a central portion extending between the first and second end portions, wherein the central portions are positioned relative to each other such that they form a transmission line for RF tunneling therealong between the first ends of the antenna traces and the second ends of the antenna traces and an RF signal received at the first ends is reradiated at the second ends. Additional systems and methods are presented.

30 Claims, 6 Drawing Sheets

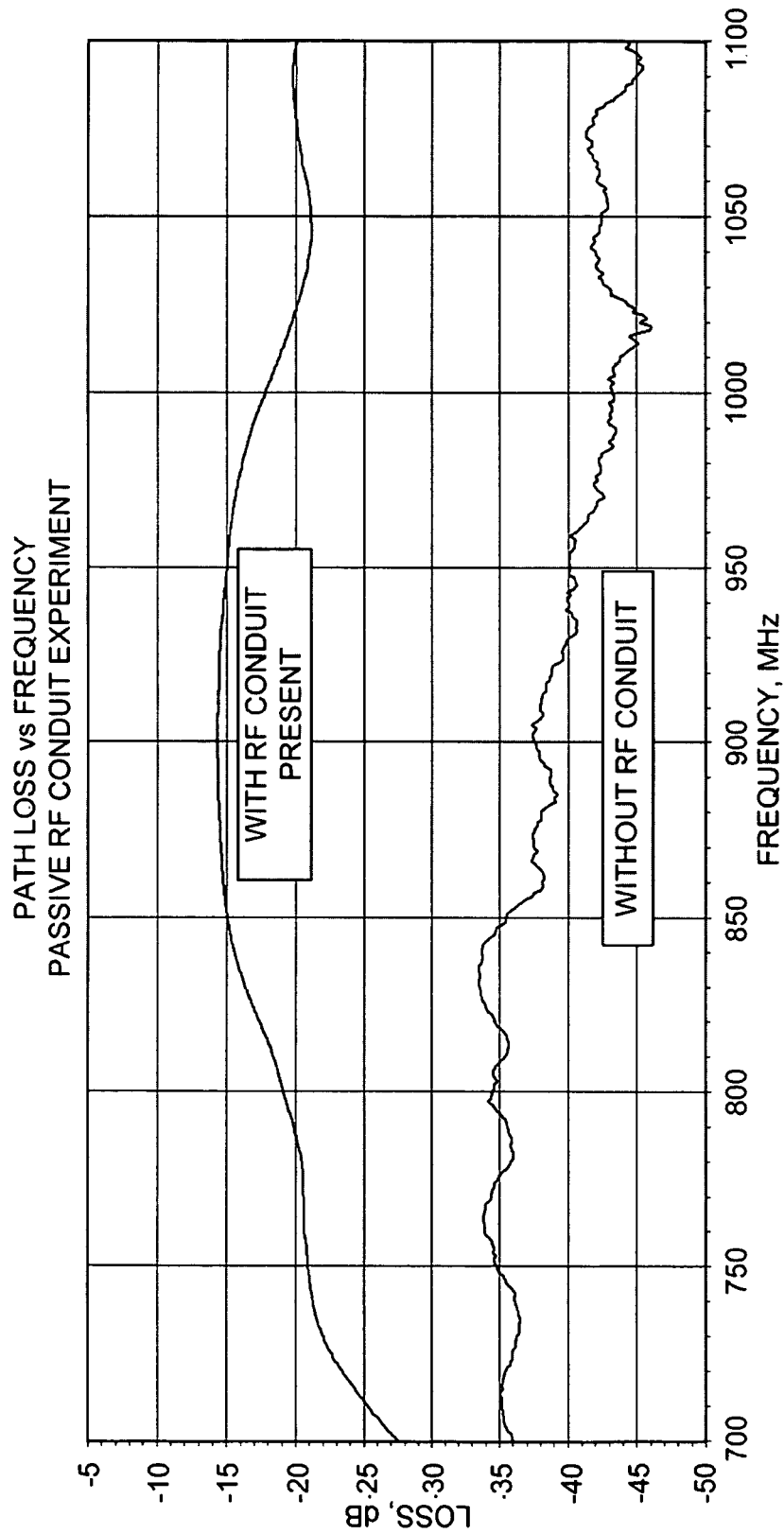

RF CONDUIT AND SYSTEMS IMPLEMENTING SAME

FIELD OF THE INVENTION

The present invention relates to Radio Frequency (RF) antennas, and more particularly, this invention relates to RF conduits.

BACKGROUND OF THE INVENTION

The use of Radio Frequency Identification (RFID) tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

A problem may be encountered when an RFID tag or other RF device is partially or fully isolated from an incoming RF signal, thereby inhibiting or preventing effective communications between the RF device and an interrogator. For example, consider the situation where an RFID tag is coupled to a box, the box being stacked on a pallet with other boxes so that the RFID tag is positioned somewhere towards the center of the stack of boxes. Further, assume that the boxes on the pallet contain some type of RF absorbing or RF reflective material. One can see the problem with effectively communicating with the RFID tag.

What is therefore needed is a way to communicate with RF devices, such as RFID tags, that are partially or fully isolated from an RF transmitting device.

SUMMARY OF THE INVENTION

An RF conduit according to one embodiment includes a pair of antennas coupled together by a transmission line such that RF tunneling occurs along the transmission line between the antennas and an RF signal received at one antenna is reradiated at the other antenna.

An RF conduit according to another embodiment includes a pair of antenna traces each having first and second end portions and a central portion extending between the first and second end portions, wherein the central portions are positioned relative to each other such that they form a transmission line for RF tunneling therealong between the first ends of the antenna traces and the second ends of the antenna traces and an RF signal received at the first ends is reradiated at the second ends.

An RF conduit according to yet another embodiment includes a container suitable for storing a consumer product therein; and a pair of antennas coupled together by a transmission line such that RF tunneling occurs along the transmission line between the antennas and an RF signal received at one of the antennas is reradiated at the other antenna, the pair of antennas being coupled to the container.

A method according to one embodiment includes placing a device between objects, wherein the device includes a pair of antennas coupled together by a transmission line such that RF tunneling occurs along the transmission line between the antennas and an RF signal received at one of the antennas is reradiated at the other antenna.

Any of these embodiments may be implemented in an RFID system, which may include an RFID tag and interrogator.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 10C is a graph plotting RF signal loss, in dB, versus Radio Frequency, in MHz.

DETAILED DESCRIPTION

Figure 1:
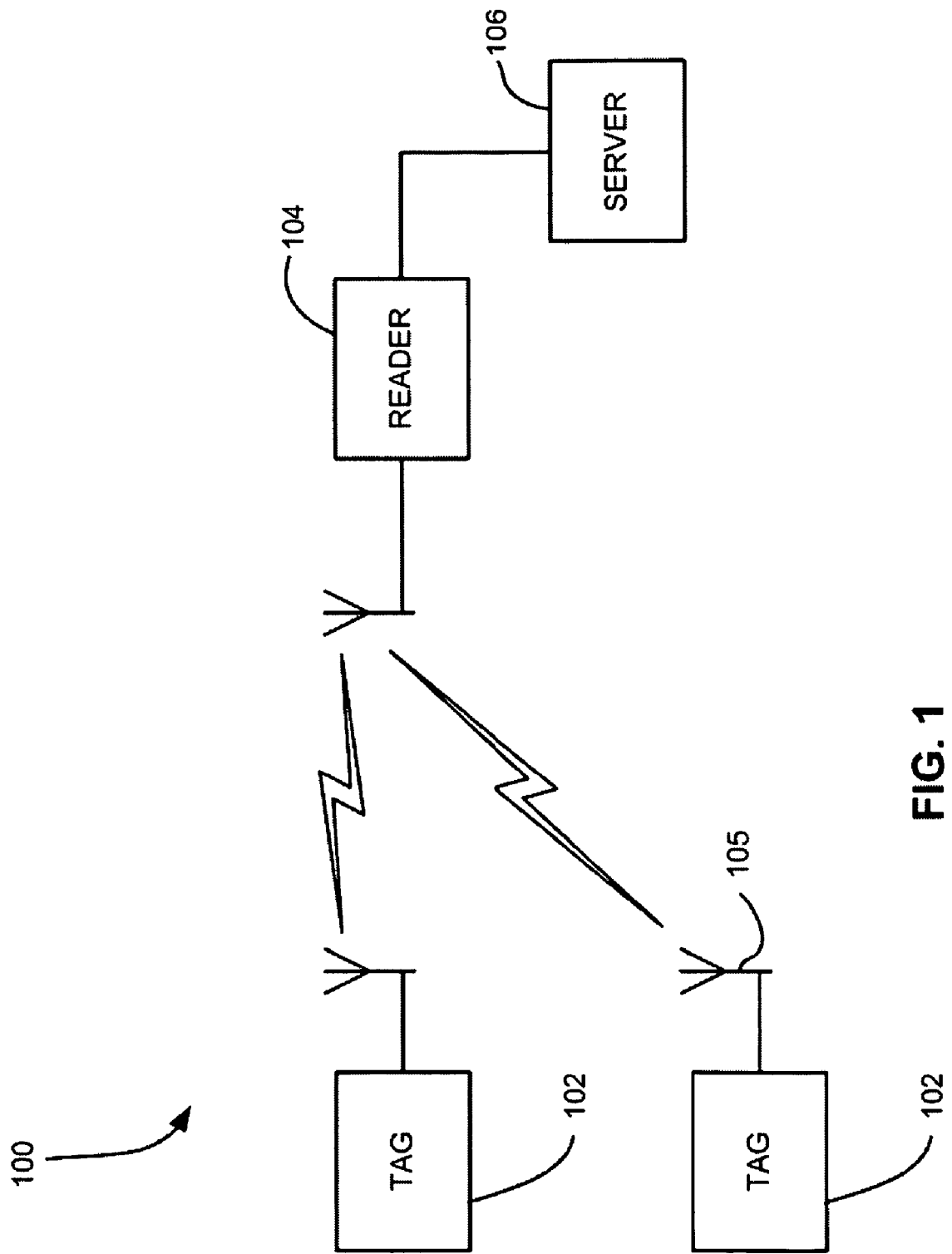
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description includes embodiments of the present invention that include a passive Radio Frequency (RF) conduit. The passive RF conduit in particularly preferred embodiments is a means to facilitate the passage of a radio wave through a region in space which is radio-absorptive, radio-reflective, radio-refractive, and/or radio-interfering. Such a region will be referred to herein as radio-antagonistic. One embodiment of the present invention includes two antennas connected by a transmission line, arranged so that when the device is in use, the antennas are positioned towards opposite sides of the radio-antagonistic region. The antenna on one end of the conduit collects RF energy from an incoming radio wave, and converts the wave's energy to a conducted electric current. This current travels down the transmission line into and though the interior of the radio-antagonistic region, until it reaches the other antenna, located on the far side of the radio-antagonistic region. While the electric current and energy are confined to the transmission line, they are immune to the deleterious effects of the radio-antagonistic region. Upon reaching the other antenna, the electric current and energy are converted by that antenna into a new radio wave, which radiates into the space on the far side of the radio-antagonistic region.

The present invention substantially reduces or eliminates the drawbacks and shortcomings associated with prior art RFID tags and related systems. As will be appreciated by one having ordinary skill in the art, various embodiments of the present invention are particularly useful in applications where multiple items are grouped together into a larger package, shipping unit, load, or other grouping of tagged items, and a radio-antagonistic region (e.g., area of RF attenuation) is formed between the individually tagged items. Examples include but are not limited to a pallet of boxes or items, a cart or bin or tote used to contain multiple items, a large box or packaging containing multiple small items, a shipping container with multiple tagged items, etc.

In one general embodiment, an RF conduit comprises a pair of antennas coupled together by a transmission line such that RF tunneling occurs along the transmission line between the antennas and an RF signal received at one antenna is reradiated at the other antenna.

In another general embodiment, an RF conduit comprises a pair of antenna traces each having first and second end portions and a central portion extending between the first and second end portions, wherein the central portions are positioned relative to each other such that they form a transmission line for RF tunneling therealong between the first ends of the antenna traces and the second ends of the antenna traces and an RF signal received at the first ends is reradiated at the second ends.

In yet another general embodiment, an RF conduit comprises a container suitable for storing a consumer product therein; and a pair of antennas coupled together by a transmission line such that RF tunneling occurs along the transmission line between the antennas and an RF signal received at one of the antennas is reradiated at the other antenna, the pair of antennas being coupled to the container.

A method in one general embodiment comprises placing a device between objects, wherein the device includes a pair of antennas coupled together by a transmission line such that RF tunneling occurs along the transmission line between the antennas and an RF signal received at one of the antennas is reradiated at the other antenna.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low-cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave bits the RFID device, and the RFID device recognizes the remote device's signal and may respond thereto. Such response may include exiting a hibernation state, sending a reply, storing data, etc.

Figure 2:
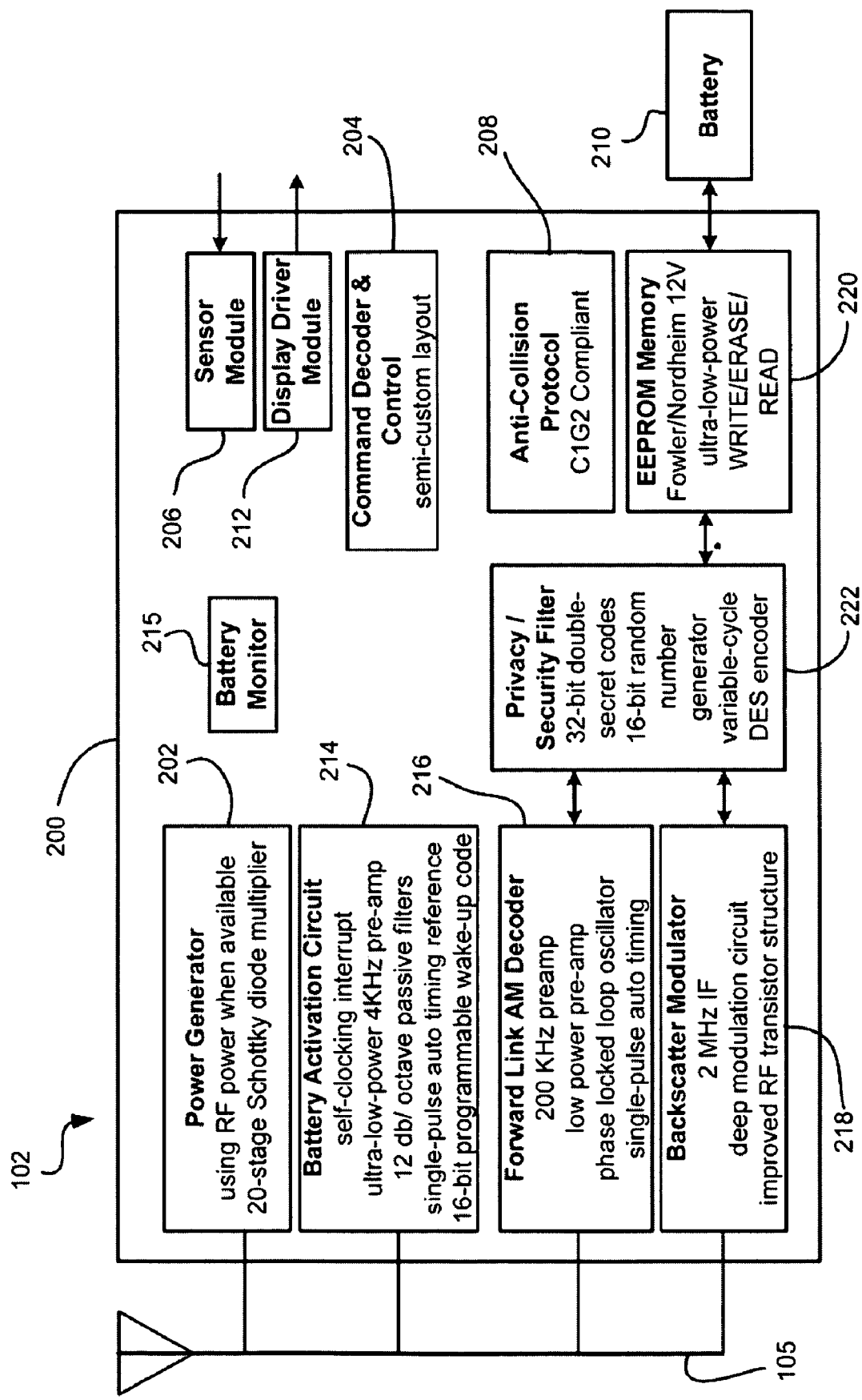
FIG. 2 is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 $\mu$A/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

Note that while the foregoing has been described in terms of a semi-passive tag, various embodiments may be used in conjunction with passive as well as active tags.

As mentioned above, when an RFID tag or other RF device is in or behind a radio-antagonistic region, e.g., is surrounded by RF absorbing or RF shielding materials, effective communication with the tag becomes difficult.

Figure 3A:
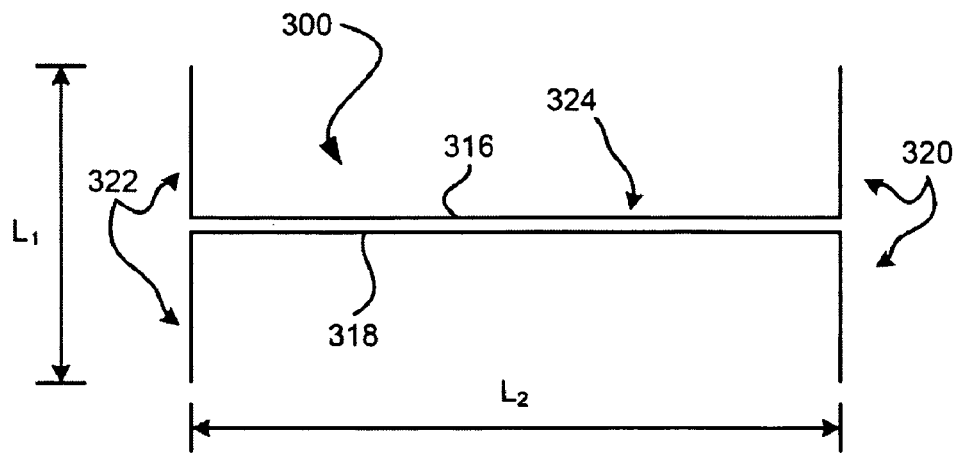
FIG. 3A is a schematic diagram of an RF conduit according to one embodiment.

Now referring to FIG. 3A, an RF conduit 300, in one embodiment, is comprised of a pair of antennas that are coupled together by a transmission line such that RF tunneling occurs along the transmission line between the antennas and an RF signal received at one antenna is reradiated at the other antenna.

In the embodiment shown in FIG. 3A, the antennas and transmission line are formed from a pair of antenna traces, 316 and 318, each having first and second end portions 320 and 322 (corresponding to the antennas), and are coupled together by a central portion 324 (corresponding to the transmission line) extending between the first and second end portions 320 and 322. The central portions 324 may be positioned relative to each other such that a transmission line is formed, the transmission line providing RF tunneling therealong between the first ends 320 of the antenna traces and the second ends 322 of the antenna traces. An RF signal received at the first ends 320 is reradiated at the second ends 322, possibly with some signal losses. Accordingly, when the antennas extend across an area of RF attenuation, the RF conduit 300 provides a mechanism to bridge that area of RF attenuation.

The antennas in a particularly preferred embodiment include resonant dipole antennas. Other types of antennas may be utilized in various embodiments, such as loop antennas, patch antennas, slot antennas, etc. The transmission line, described above as a parallel-wire line, may take another form, such as a coaxial line, a microstrip line, a twisted-pair line, etc.

Length $L_1$, the length of one end portion, may be set such that it is about one half wavelength ($\lambda/2$) of the desired radio frequency wavelength ($\lambda$) which is to be reradiated by the antenna system 300. Note that other lengths may be employed as well. Accordingly, the length $L_1$ may be shorter or longer than a half wavelength, and the end portions 320 and 322 need not be fed at their centers.

The length $L_2$ of the central portion 324 may be selected based on any desired criteria. For example, length $L_2$ may be set according to the particular application, e.g., the length of a box that the pair of antennas is being placed on, the length of a pallet, the length of a package, etc. In various embodiments, $L_2$ is at least about 6, at least about 12, at least about 18, at least about 24, at least about 36, at least about 60, etc. inches in length.

Figure 3B:
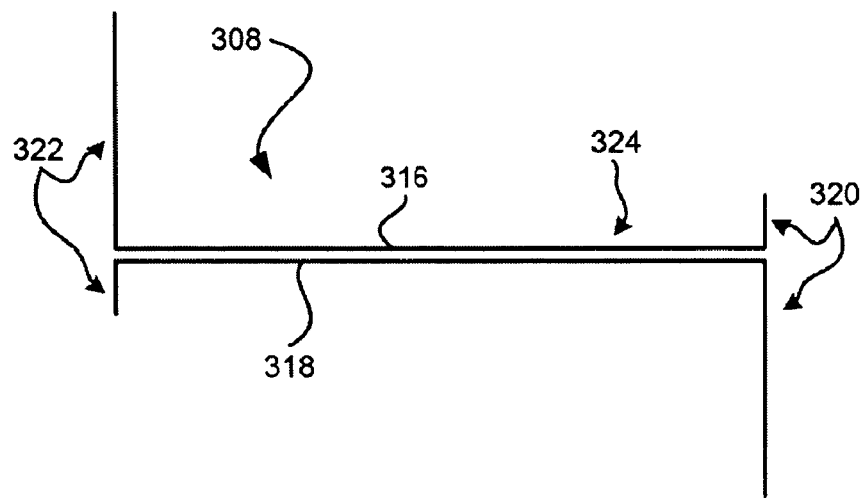
FIG. 3B is a schematic diagram of an RF conduit according to another embodiment.

In the particular embodiment shown, the first end portions 320 of the antenna traces 316 and 318 are about the same length, i.e., each antenna trace 316 and 318 comprises about half of each end portion 320 and 322. However, other approaches are possible, such as the embodiment shown in FIG. 3B, where the antenna system 308 is comprised of end portions 320 and 322 which are each comprised less than half by one antenna trace, and more than half by the other antenna trace. Any other configuration where the length $L_1$ is at least one half wavelength ($\lambda/2$) of the desired radio frequency wavelength ($\lambda$) are possible.

In some embodiments, no electronics are in electrical communications with the antenna traces 316 and 318. Other embodiments have such electronics. See, e.g., FIG. 8.

In a further embodiment, the RF conduit 300 further comprises third and fourth antenna traces having first and second end portions and a central portion extending between the first and second end portions, wherein the central portions of the third and fourth antenna traces are positioned relative to each other such that RF tunneling occurs therealong between the first ends of the third and fourth antenna traces and the second ends of the third and fourth antenna traces and an RF signal received at the first ends of the third and fourth antenna traces is reradiated at the second ends of the third and fourth antenna traces. This structure could look similar to the RF conduit 600 shown in FIG. 6, described in more detail below.

In one embodiment, at least parts of the central portions of the first and second antenna traces are oriented about perpendicular to at least parts of the central portions of the third and fourth antenna traces. In other embodiments, the central portions may be oriented at angles other than perpendicular.

Figure 4:
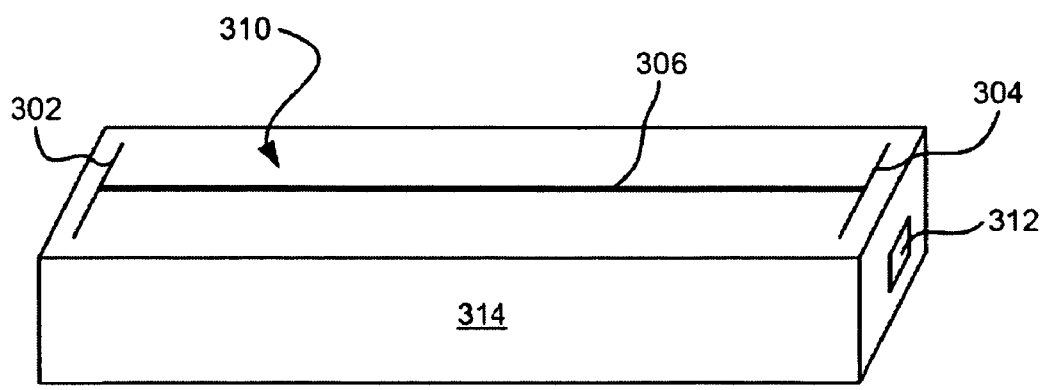
FIG. 4 is a schematic diagram of an RF conduit which includes a container according to one embodiment.

In FIG. 4, an RF conduit 310 is shown which is comprised of a container 314 suitable for storing a consumer product therein and a pair of antennas, 302 and 304 (e.g., end portions in FIG. 3A), which are coupled together by a transmission line 306 (e.g., central portions as in FIG. 3A) such that RF tunneling occurs along the transmission line 306 between the antennas 302 and 304 and an RF signal received at one of the antennas is reradiated at the other antenna. The pair of antennas 302 and 304 may be coupled to the container 314, e.g., adhered thereto by an adhesive, built into the container, etc. In addition, the antennas 302 and 304 may be positioned toward two opposite ends of the container 314 as shown in FIG. 4, or may be positioned in any manner which is suitable for the particular application.

Still referring to FIG. 4, according to another embodiment, a tag 312 on or in the container 314 near the immediate vicinity of the antennas 302 and 304, which may be an RFID tag, may be in communication with the transmission line 306 and may use the antennas 302 and 304 to enhance the RF communication to and from the tag 312.

In another embodiment, the tag 312 is coupled to the container and is spaced from the antennas 302 and 304.

In a further embodiment, the RF conduit 310 may reradiate the RF signal from the tag 312 to the other end of the container 314, possibly with some signal strength losses. However, the RF signal from the tag 312 should be reradiated through the transmission line 306 with more signal strength than would occur from the tag 312 alone in the absence of the RF conduit 310.

As noted previously, electronics may or may not be in electrical communication with the antennas 302 and 304.

In another embodiment, the antennas 302 and 304 are embedded, at least in part, in the container 314. Further, the antennas 302 and 304 may extend towards two opposite ends of the container 314, as shown in FIG. 4, may wrap around ends of the container, or may extend in any direction and to any extent which is suitable for the particular application.

Figure 5:
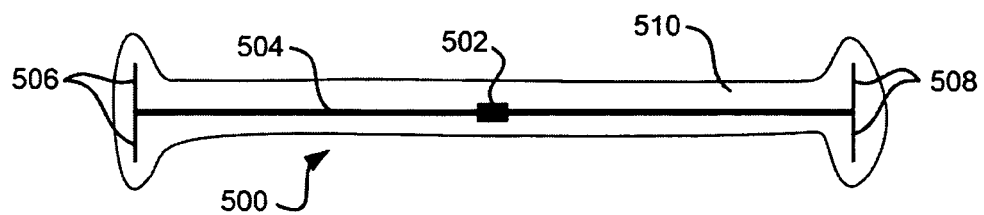
FIG. 5 is a schematic diagram of an RF conduit according to another embodiment.

Now referring to FIG. 5, a schematic diagram of another RF conduit 500 is shown according to one embodiment. In this RF conduit 500, a pair of antennas 506 and 508 are coupled together by the transmission line 504 which is designed such that RF tunneling occurs along the transmission line 504 between the antennas, 506 and 508, and an RF signal received at one antenna is reradiated at the other antenna. A chip 502 may be in communication with the transmission line 504, e.g., be soldered thereto, and may use the antennas 506 and 508 for communication. This chip 502 may be an RFID chip. In one configuration, the RF conduit 500 acts as a tag with external antennas. In another configuration, the RF conduit 500 may act not only to reradiate signals, but also may act as an antenna system for the RFID chip 502 creating a greater signal range in which the RFID chip 502 could be sensed and/or communicated with by an RFID sensing apparatus. Note that in this embodiment, the antenna on each end of the transmission line may include one or more RF conductors, and the RF conductors may or may not be in physical contact with the antenna or transmission line.

In another embodiment, a backing 510 may be coupled to the RF conduit 500. This backing 510 may have adhering characteristics, such as a sticky underside, so that it may adhere to another structure such as a container, carton, palette, etc. The RF conduit 500 may also be adhered to the backing 510 through this adhering characteristic, and then adhered to a structure in the same fashion. In addition, the backing 510 may be rigid to support the RF conduit 500, or may be flexible if the particular application could use a flexible approach. Illustrative materials for the backing 510 include paper, PCB, plastics, and other preferably substantially RF transparent materials.

Figure 6:
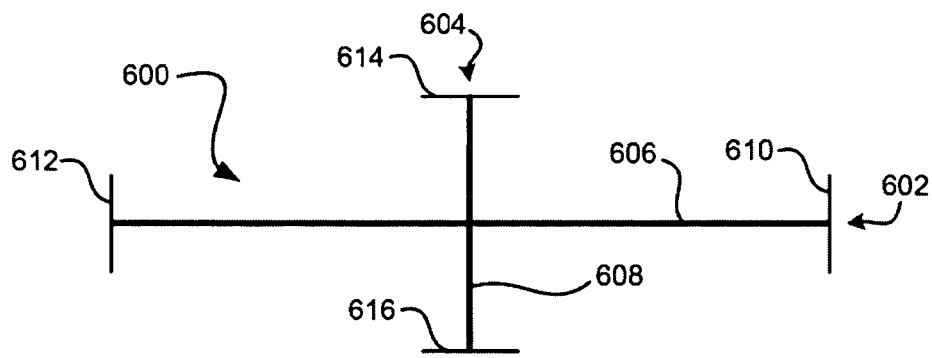
FIG. 6 is a schematic diagram of an RF conduit according to one embodiment.

FIG. 6 shows a schematic diagram of another RF conduit 600 according to one embodiment. This RF conduit 600 may be comprised of a first conduit 602 and a second conduit 604. Each conduit 602 and 604 is comprised of a pair of antennas: antennas 610 and 612 for system 602, and antennas 614 and 616 for system 604, which are coupled together by a transmission line 606 for system 602 and transmission line 608 for system 604, each of which is designed such that RF tunneling occurs along the transmission line between the antennas and an RF signal received at one antenna is reradiated at the other antenna or antennas. The conduits 602 and 604 cross at some point, preferably near the middle of the transmission lines 606 and 608 of each of the conduits 602 and 604. The transmission lines 606 and 608 of each of the conduits 602 and 604 may be coupled together, e.g., cross-connected so that any one of the four antennas can collect signals which may be reradiated by all of the other three antennas. This option could be further expanded to include two pairs of cross-connected conduits, so that both vertical and horizontal polarizations at any of the four ports would be reradiated as the same polarizations at any of the other three ports.

In various embodiments, the two conduits 602 and 604 may connect different axes of a container, as shown, left-right and front-rear. It is also possible to use two separate conduits on the same axis, connecting, say, left-right with vertically polarized antennas and with horizontally polarized antennas. Note that connecting vertical and horizontal antennas together at each end, and using only one transmission line, results in a single slant polarization, rather than dual polarizations where two transmission lines are used. However, one useful option is to use a vertically polarized antenna at one end and horizontally polarized antenna at the other end of a single transmission line. Such a conduit serves to provide the 'other' polarization at the destination end.

The angles which the transmission lines make with each other are generally not relevant; the transmission lines are fairly impervious to such things, unless the are directly (metallically) connected to each other. Accordingly, the transmission lines 606 and 608 of each of the conduits 602 and 604 may be set at any angle relative to each other.

Each transmission line 606 and 608 may be of the same or differing lengths depending on the particular application. Also, each antenna for each conduit 602 and 604 may be of the same or differing lengths, depending on the particular application.

In one embodiment, at least a portion of transmission line 608 from the second conduit 604 is oriented at an angle of greater than about 0° and less than about 180° relative to at least a portion of transmission line 606 from the first conduit 602. In a particularly preferred embodiment, the angle is about 90°.

Figure 7:
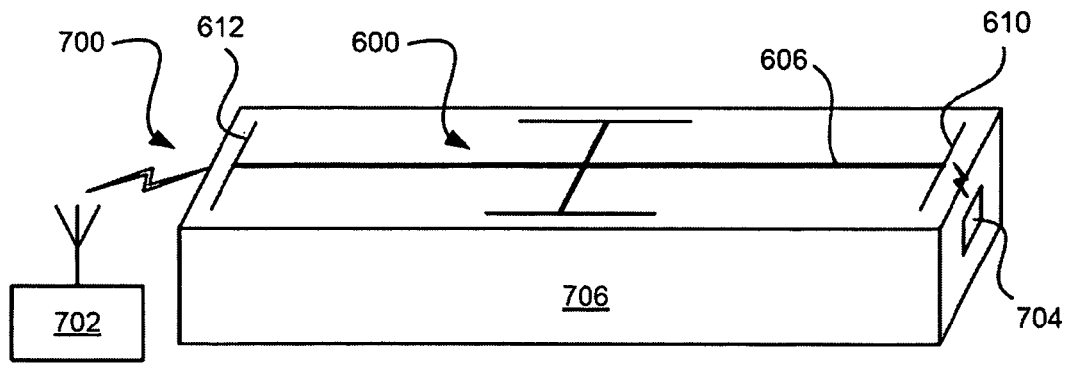
FIG. 7 is a schematic diagram of an RF conduit system comprised of two RF conduits which includes a container according to one embodiment.

FIG. 7 shows an RF conduit system 700 comprising a conduit 600 with a container 706 according to another embodiment. In this embodiment, RF conduit 600 is coupled to a container 706 which is suitable for storing a consumer product therein. A tag 704, which may be an RFID tag, is coupled to the container 706 at a first end. The tag 704 may be placed anywhere on the container 706 that is near an immediate vicinity of a transmission line or antenna (such as antenna 610). As shown in FIG. 7 as a jagged line, a signal from the tag 704 travels to the nearest antenna 610, allowing the conduit RF 600 to enhance the strength and range of the RF signal produced by the tag 704 visible on the opposite side of the container 706. Also, the RF conduit 600 may transmit the RF signal from the tag 704 to an RFID sensing apparatus 702. This may allow an RFID sensing apparatus 702, e.g., interrogator, to detect and/or communicate with an tag 704 that it would otherwise not be able to detect because of the radio-antagonistic effect caused by the container 706 and any other surrounding objects blocking some of the RF signal.

Figure 8:
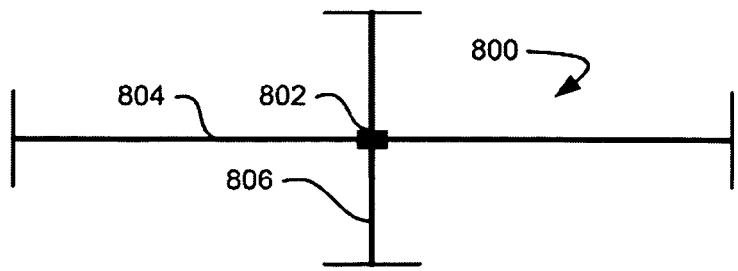
FIG. 8 is a schematic diagram of an RF conduit system which is comprised of two RF conduits and includes a chip.

Now referring to FIG. 8, another embodiment is shown where an RF conduit 800 has an RFID chip 802 coupled thereto. The RFID chip 802 may be placed somewhere near the intersection of the two transmission lines 804 and 806, or anywhere else along the transmission lines and/or antennas. RF conduit 800 may be used in conjunction with a container, palette, box, shipping carton, or any other structure that may block RF signals from reaching an RFID sensing apparatus.

Figure 9:
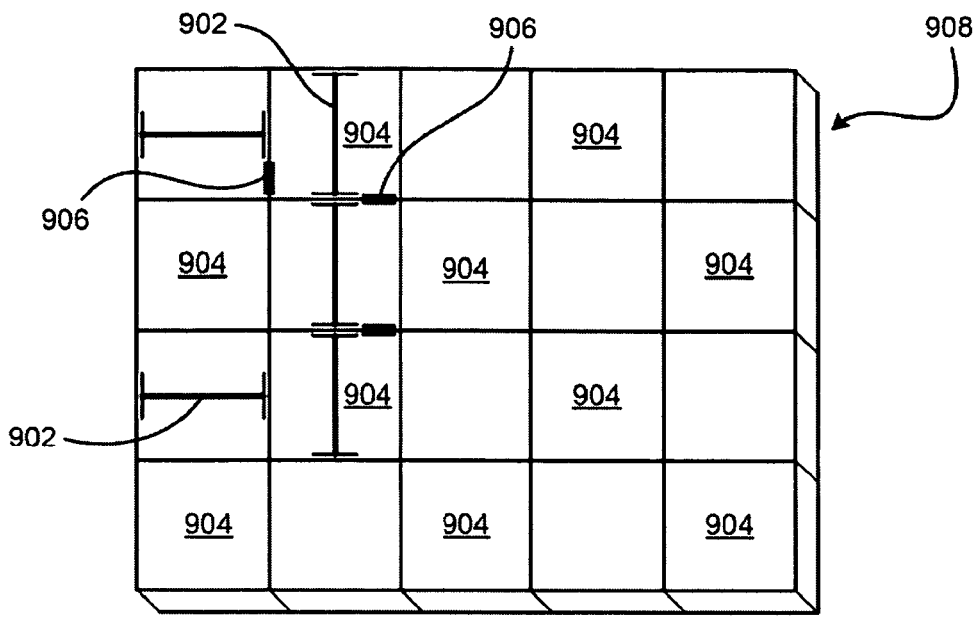
FIG. 9 is a schematic diagram of a particularly useful application for RF conduits.

FIG. 9 shows one particularly useful application for RF conduits. In this embodiment, the close spacing of the containers 904 creates radio-antagonistic regions between an exterior of the stack of containers 904 and the interior where some of the tags 906 are located. A plurality of RF conduits 902 are placed on containers 904 so that signals from the tag 906 can be read from outside of the stack of containers 908, and so that signals from outside the stack of containers 908 may be read by the tags 906. Any type of container may be present such as boxes, cartons, palettes, etc. The RF conduits 902 may be placed on top of the containers 904, on the sides of the containers 904, offset from the center of the containers 904, under the containers 904, inside the containers 904, partially or fully embedded in the containers 904, or any other place that is convenient for the user. The tags 906 are preferably placed near the antennas from one or more of the RF conduits 902. This application also works where containers 904 are stacked more than one unit high, as shown, and may be used with stacks of any height. In such case, an incoming or outgoing RF signal may traverse several of the RF conduits 902. The containers 904 may also be staggered or offset, and do not need to be uniformly stacked, as shown in FIG. 9. In addition, the RF conduits are shown as system 300 from FIG. 3A, but any type of RF conduit may be used, such as those shown in FIGS. 3B-8.

In other applications, RF conduits may be used to assist in communication in any radio-antagonistic environment, for instance, an RF conduit can be used to assist in access to RFID tags in a metal filing cabinet by placing one end in the cabinet and one end out of the cabinet. Likewise, the RF conduit may be used with shipping containers, truck trailers, train cars, etc.

In another embodiment, a method for reradiating an RF signal comprises placing a device between objects, such as containers on a pallet, pallets in a stack, packages in a stack, etc., wherein the device includes a pair of antennas coupled together by a transmission line such that RF tunneling occurs along the transmission line between the antennas and an RF signal received at one of the antennas is reradiated at the other antenna, such as that shown in FIGS. 3A-9.

Figure 10A:
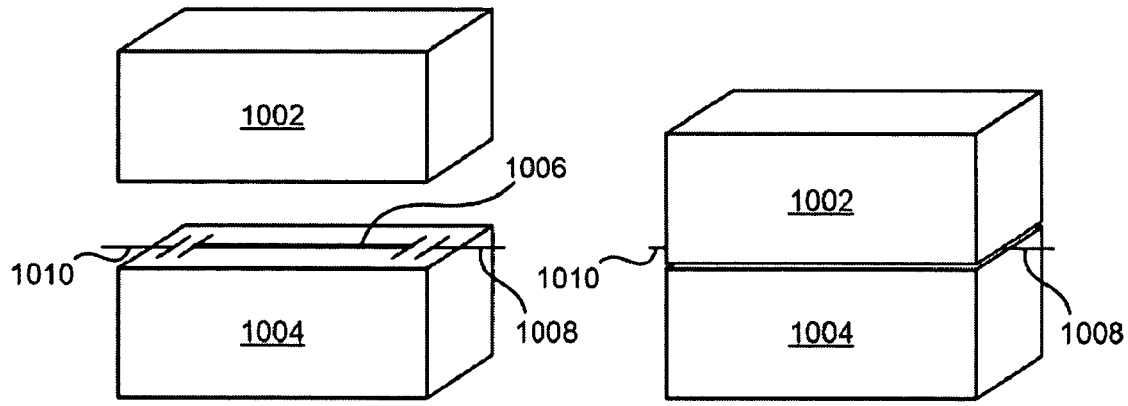
FIG. 10A is a schematic diagram of preparation for an experiment using a passive RF conduit between two blocks of RF dissipating material.
Figure 10B:
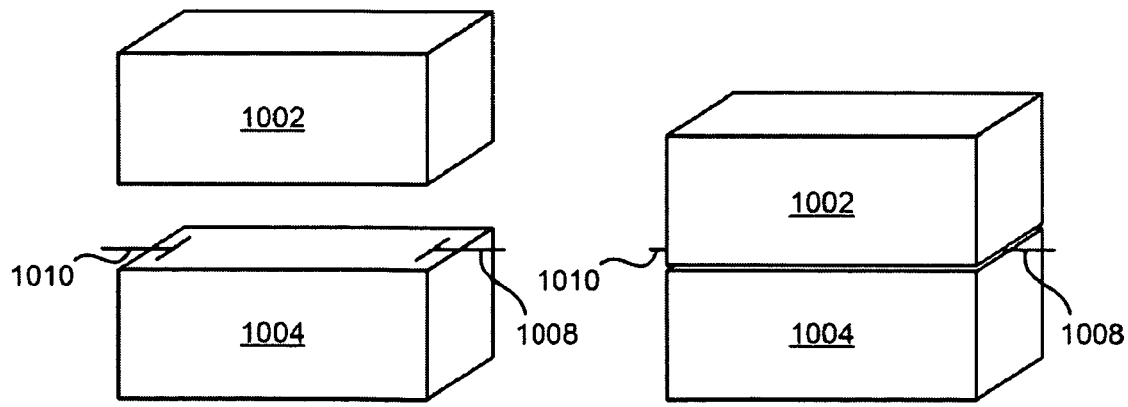
FIG. 10B is a schematic diagram of preparation for an experiment not using a passive RF conduit between two blocks of RF dissipating material.

Now referring to FIGS. 10A and 10B, a passive RF conduit experiment is shown. In FIG. 10A, in the first experiment, two blocks of RF absorbing material, 1002 and 1004, are placed around an RF conduit 1006. RF antennas 1008 and 1010 are placed near the ends of the RF conduit 1006, and an RF signal was passed through antenna 1008 and read at antenna 1010.

In FIG. 10B, the second portion of the experiment is shown where no RF conduit is placed between the RF absorbing blocks 1002 and 1004. Once again, an RF signal was passed through antenna 1008 and read with antenna 1010. The results of the experiment are shown in FIG. 10C.

As is shown in FIG. 10C, the loss of signal strength is significantly reduced when an RF conduit is used (upper line, With RF Conduit Present) as compared to the signal strength loss without an RF conduit (lower line, Without RF Conduit). The reduction in signal strength loss is especially pronounced around about 850-960 MHz, which is a range in which many RF devices transmit, making it particularly useful for RF signal loss reduction. Note that the various embodiments may be used in conjunction with various RF frequencies, as will be understood by those skilled in the art. In illustrative embodiments, the RF conduit is used in conjunction with VHF, UHF, and higher frequency ranges.

While much of the foregoing has been described in terms of use with RFID systems, it is again stressed that the various embodiments may be used in conjunction with other types of RF devices, such as receive-only RF devices, 1- and 2-way radios, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency (RF) conduit, comprising:
   a pair of antennas coupled together by a transmission line such that RF tunneling occurs along the transmission line between the antennas and an RF signal received at one antenna is reradiated at the other antenna;
   wherein the RF conduit is physically characterized as being capable of reducing a loss of signal strength of a signal received by one of the antennas positioned towards a first side of an RF absorbing material and reradiated by the other antenna positioned towards a second side of the RF absorbing material opposite the first side by about 8 dB to about 25 dB in a frequency range of 700 to 1100 megahertz (MHz) relative to traversal of the signal throuih the RF absorbintt material from the first side thereof to the second side thereof in absence of the RF conduit.

2. The RF conduit of claim 1, further comprising a chip coupled to the transmission line between the antennas, wherein the chip is a Radio Frequency Identification (RFID) chip.

3. The RF conduit of claim 1, with a proviso that no electronics are in electrical communication with the antennas.

4. The RF conduit of claim 1, further comprising a container suitable for storing a consumer product therein, wherein the antennas are coupled to the container, wherein the container is at least part of the RF absorbing material.

5. The RF conduit of claim 1, wherein the antennas extend across an area of RF attenuation.

6. The RF conduit of claim 1, further comprising a second pair of antennas coupled together by a second transmission line such that RF tunneling occurs along the second transmission line between the second pair of antennas and an RF signal received at the first ends of the second pair of antennas is reradiated at the second ends of the second pair of antennas.

7. The RF conduit of claim 6, wherein at least a portion of the second transmission line coupled to the second pair of antennas is oriented at an angle of greater than 0 and less than 180 degrees relative to at least a portion of the transmission line coupled to the pair of antennas.

8. The RF conduit of claim 7, wherein the transmission line and the second transmission lines are electrically isolated from each other.

9. The RF conduit of claim 6, wherein at least a portion of the second transmission line coupled to the second pair of antennas is oriented about perpendicular to at least a portion of the transmission line coupled to the pair of antennas.

10. The RF conduit of claim 1, wherein one of the antennas is a horizontally polarized antenna and the other of the antennas is a vertically polarized antenna.

11. A Radio Frequency (RF) conduit system, comprising:
    a pair of antennas coupled together by a transmission line such that RF tunneling occurs along the transmission line between the antennas and an RF signal received at one antenna is reradiated at the other antenna; and
    a container, wherein the antennas are embedded, at least in part, in the container,
    wherein the antennas and transmission line are physically characterized as being capable of reducing a loss of signal strength of a signal received by one of the antennas positioned towards a first side of the container and reradiated by the other antenna positioned towards a second side of the container opposite the first side by about 8 dB to about 25 dB in a frequency range of 700 to 1100 megahertz (MHz) relative to traversal of the signal through the container from the first side thereof to the second side thereof in the absence of the antennas and transmission line.

12. The RF conduit system of claim 11, wherein the antennas extend towards two opposite ends of the container and arranged in the container so that an RF signal received at one antenna at an outside of the container is reradiated at the other antenna at an outside of the container.

13. A Radio Frequency (RF) conduit, comprising:
    a first pair of antennas coupled together by a transmission line such that RF tunneling occurs along the transmission line between the antennas and an RF signal received at one antenna is reradiated at the other antenna; and
    a second pair of antennas coupled together by a second transmission line such that RF tunneling occurs along the second transmission line between the second pair of antennas and an RF signal received at the first ends of the second pair of antennas is reradiated at the second ends of the second pair of antennas,
    wherein at least a portion of the second transmission line coupled to the second pair of antennas is oriented at an angle of greater than 0 and less than 180 degrees relative to at least a portion of the transmission line coupled to the pair of antennas,
    wherein the transmission line and the second transmission lines are physically coupled together such that RF tunneling occurs along the transmission lines between the antennas and an RF signal received at one antenna is reradiated at the other antennas,
    wherein the RF conduit is physically characterized as being capable of reducing a loss of signal strength of a signal received by one of the antennas of the first pair positioned towards a first side of an RF absorbing material and reradiated by the other antenna of the first pair positioned towards a second side of the RF absorbing material opposite the first side by about 8 dB to about 25 dB in a frequency range of 700 to 1100 megahertz (MHz) relative to traversal of the signal through the RF absorbing material from the first side thereof to the second side thereof in absence of the RF conduit.

14. The RF conduit of claim 13, further comprising a chip in communication with the transmission line and/or the second transmission line.

15. A Radio Frequency (RF) conduit, comprising:
    a pair of antennas coupled together by a transmission line such that RF tunneling occurs along the transmission line between the antennas and an RF signal received at one antenna is reradiated at the other antenna, wherein the antennas and transmission line are physically characterized as being capable of reducing a loss of signal strength of a signal received by one of the antennas positioned towards a first side of an RF absorbing material and reradiated by the other antenna positioned towards a second side of the RF absorbing material opposite the first side by about 8 dB to about 25 dB in a frequency range of 700 to 1100 megahertz (MHz) relative to traversal of the signal through the RF absorbing material from the first side thereof to the second side thereof in the absence of the antennas and transmission line;

a second pair of antennas coupled toeether by a second transmission line such that RF tunneling occurs along the second transmission line between the second pair of antennas and an RF signal received at the first ends of the second pair of antennas is reradiated at the second ends of the second pair of antennas; and a third pair of antennas and a third transmission line coupled to the third pair of antennas and a fourth pair of antennas and a fourth transmission line coupled to the fourth pair of antennas oriented with respect to the antennas, second antennas, transmission line and second transmission line so that both vertical and horizontal polarizations at one of the antennas is reradiated as the same polarizations by at least one of the other antennas.

16. A Radio Frequency (RF) conduit, comprising:
first and second antenna traces each having first and second end portions and a central portion extending between the first and second end portions,
wherein the central portions are positioned relative to each other such that they form a transmission line for RF tunneling therealong between the first end portions of the antenna traces and the second end portions of the antenna traces and an RF signal received at the first end portions is reradiated at the second end portions of the antenna traces,
wherein each central portion is at least 12 inches long,
wherein the RF conduit physically characterized as being capable of reducing a loss of signal strength of a signal received by the first end portion positioned towards a first side of an RF absorbing material and reradiated by the other antenna positioned towards a second side of the RF absorbing material opposite the first side by about 8 dB to about 25dB in a freauencv range of 700 to 1100 megahertz (MHz) relative to traversal of the signal through the RF absorbing material from the first side thereof to the second side thereof in the absence of the antennas and transmission line.

17. The RF conduit of claim 16, wherein the first end portions of the antenna traces are about the same length.

18. The RF conduit of claim 16, wherein the first end portions of the antenna traces have different lengths.

19. The RF conduit of claim 16, wherein the first end portions of the antenna traces have a total length of about one-half a wavelength of an RF signal tunneling along the central portions.

20. The RF conduit of claim 16, with the proviso that no electronics are in electrical communication with the antenna traces.

21. The RF conduit of claim 16, further comprising third and fourth antenna traces having first and second end portions and a central portion extending between the first and second end portions, wherein the central portions of the third and fourth antenna traces are positioned relative to each other such that RF tunneling occurs therealong between the first end portions of the third and fourth antenna traces and the second end portions of the third and fourth antenna traces and an RF signal received at the first end portions of the third and fourth antenna traces is reradiated at the second end portions of the third and fourth antenna traces.

22. The RF conduit of claim 21, wherein at least parts of the central portions of the first and second antenna traces are oriented at an angle of greater than 0 and less than 180 degrees relative to at least parts of the central portions of the third and fourth antenna traces.

23. The RF conduit of claim 21, wherein at least parts of the central portions of the first and second antenna traces are oriented about perpendicular to at least parts of the-central portions of the third and fourth antenna traces.

24. A Radio Frequency (RF) conduit, comprising:
a container suitable for storing a consumer product therein; and
a pair of antennas coupled together by a transmission line such that RF tunneling occurs along the transmission line between the antennas and an RF signal received at one of the antennas is reradiated at the other antenna, the pair of antennas being coupled to the container,
wherein the antennas are positioned towards two opposite outer ends of the container,
wherein the antennas and transmission line are physically characterized as being capable of reducing a loss of signal strength of a signal received by one of the antennas and reradiated by the other antenna by about 8 dB to about 25 dB in a frequency range of 700 to 1100 megahertz (MHz) relative to traversal of the signal through the container between the opposite ends thereof in the absence of the antennas and transmission line.

25. The RF conduit of claim 24, further comprising a chip in communication with the transmission line.

26. The RF conduit of claim 24, with the proviso that no electronics are in electrical communication with the antennas.

27. The. RF conduit of claim 24, further comprising a second pair of antennas coupled together by a second transmission line such that RF tunneling occurs along the second transmission line between the second pair of antennas and an RF signal received at the first ends of the second pair of antennas is reradiated at the second ends of the second pair of antennas, wherein the transmission line and the second transmission lines are coupled together such that RF tunneling occurs along the transmission lines between the antennas and an RF signal received at one antenna is reradiated at the other antennas.

28. A method, comprising:
placing a device between objects, wherein the device includes a pair of antennas coupled together by a transmission line such that RF tunneling occurs along the transmission line between the antennas and an RF signal received at one of the antennas is reradiated at the other antenna,
wherein the device is physically characterized as being capable of reducing a loss of signal strength of a signal received by one of the antennas positioned towards a first side of the objects and reradiated by the other antenna positioned towards a second side of the objects opposite the first side by about 8 dB to about 25 dB in a frequency range of 700 to 1100megahertz (MHz) relative to traversal of the signal through the objects from the first side thereof to the second side thereof in the absence of the device.

29. The method of claim 28, wherein the transmission lines are at least 12 inches long.

30. The method of claim 28, wherein the antennas are sandwiched between outer sides of the objects after placing the device between the objects.

* * * * *

UNITED STATES PATENT AND TRADEMARK OFFICE
CERTIFICATE OF CORRECTION

| | | |
|---|---|---|
| PATENT NO. | : 8,115,688 B2 | Page 1 of 1 |
| APPLICATION NO. | : 12/258304 | |
| DATED | : February 14, 2012 | |
| INVENTOR(S) | : Edward M. Farrell | |

It is certified that error appears in the above-identified patent and that said Letters Patent is hereby corrected as shown below:

In column 5, line 13, "Low-cost" should be replaced with --Low cost--.
In column 5, line 60, "bits" should be replaced with --hits--.
In column 11, line 32, "throuih" should be replaced with --through--.
In column 11, line 32, "absorbintt" should be replaced with --absorbing--.
In column 13, line 9, "touether" should be replaced with --together--.
In column 13, line 41, "freauencv" should be replaced with --frequency--.
In column 14, line 8, "the-central" should be replaced with --the central--.

Signed and Sealed this
Seventeenth Day of April, 2012

David J. Kappos
*Director of the United States Patent and Trademark Office*